United States Patent [19]

Wirth et al.

[11] Patent Number: 4,737,326

[45] Date of Patent: Apr. 12, 1988

[54] REFRACTORY SHAPES OF CERAMIC FIBER-CONTAINING MATERIAL

[75] Inventors: Ludwig Wirth; Ingo Elstner, both of Wiesbaden; Ulrich Hintzen, Taunusstein; Rudolf Ganz, Mainz; Miroslav Rausch, Bad Schwalbach-Hettehain; Robert Burger, Monsheim, all of Fed. Rep. of Germany

[73] Assignee: Didier-Werke AG, Wiesbaden, Fed. Rep. of Germany

[21] Appl. No.: 802,222

[22] Filed: Nov. 26, 1985

[30] Foreign Application Priority Data

Dec. 5, 1984 [DE] Fed. Rep. of Germany ....... 3444397

[51] Int. Cl.$^4$ .............................................. C04B 33/32
[52] U.S. Cl. ........................................ 264/56; 264/86; 264/87
[58] Field of Search ............................. 264/86, 87, 56

[56] References Cited

U.S. PATENT DOCUMENTS

| 3,976,728 | 8/1976 | Hawthorne | 264/87 |
| 4,401,613 | 8/1983 | Abell et al. | 264/86 |
| 4,421,599 | 12/1983 | Kuzuoka | 162/100 |
| 4,569,920 | 2/1986 | Smith-Johannsen | 264/86 |

FOREIGN PATENT DOCUMENTS

| 0077444 | 4/1983 | Eurpean Pat. Off. | |
| 52-10126 | 3/1977 | Japan | 264/86 |
| 60-149403 | 8/1985 | Japan | 264/87 |
| 804756 | 11/1958 | United Kingdom | 264/86 |
| 1283692 | 8/1972 | United Kingdom | |

Primary Examiner—James Derrington
Attorney, Agent, or Firm—Wenderoth, Lind & Ponack

[57] ABSTRACT

Process for the production of refractory shapes of ceramic fiber-containing mateial, wherein a slurry of refractory fibers and particulate refractory materials is produced in water, the particulate refractory materials are flocculated on the fibers by use of a flocculant, and the desired shape is produced by dewatering the slurry in a suitable mold that enables the water to be removed, and the shape is dried. At least 90% of the fibers have a maximum length of not more than 500 $\mu$m; flocculant is added as an aqueous solution to the dispersion of the fibers and particulate refractory material; and pressure is applied to the shape being formed during the dewatering of the slurry to form the desired shape in order to compress the shape.

12 Claims, No Drawings

REFRACTORY SHAPES OF CERAMIC FIBER-CONTAINING MATERIAL

BACKGROUND OF THE INVENTION

The present invention relates to a process for the production of fireproof or refractory (hereinafter referred to collectively as "refractory") shapes of ceramic fiber-containing material, wherein (a) a slurry of fireproof and/or refractory fibers (hereinafter referred to collectively as "refractory fibers") and fine-grained and/or finely divided, fireproof and/or refractory materials (hereinafter referred to collectively as "particulate refractory material") and optionally other additives is produced in water, (b) the particulate refractory material is flocculated on the fibers by means of a flocculant, and (c) the desired shape is produced by dewatering the slurry in a suitable mold that enables the water to be removed, followed by drying the shapes.

The invention also relates to the shapes produced in accordance with this process, as well as the use of these shapes.

A refractory, heat-insulating material is known from Accepted West German Specification (DE-AS) No. 19 47 904 produced from 10 to 97 parts by weight of a refractory fiber component and 1 to 20 parts by weight of a metal powder, using colloidal silicon dioxide sol and starch as binders. In this publication, it is recited that an aqueous slurry containing 1% solids is produced from these solid constituents, the slurry is subsequently dewatered in suitable sieve molds, and the resulting shape is dried at temperatures of 160° C.

A fiber-reinforced board and a process for the production thereof are known from European Published Patent Application No. 0 077 444, wherein the fiber-reinforced board contains 15 to 40 parts by weight of ceramic fibers, 1 to 6 parts by weight of organic fibers, 1 to 6 parts by weight of an organic binder, 0 to 5 parts by weight of colloidal silicon dioxide, 0.2 to 2 parts by weight of a flocculant, and about 50 to 80 parts by weight of an inorganic, refractory filler. According to the process described in this publication, the organic fibers are first broken down in a grinding machine at a solids content of about 1 to 15 parts by weight in an aqueous slurry, whereupon the other constituents are added. It is indicated that the binder and the colloidal silicon dioxide are deposited on the fibers by the flocculant. Polyacrylamide, polyacrylimide and compounds producing polyvalent ions are disclosed as flocculants. Starch can be used as a binder.

Furthermore, a fibrous material is known from European Patent Application No. 0 073 854, for whose production fibers dispersed in water are first impregnated with a flocculant, then dried. An aqueous dispersion is then again produced from these impregnated dried fibers, which may also be inorganic fibers, with the addition of finely divided inorganic powders, and a board-like material is formed by a papermaking process. However, in this publication, it is expressly stated that the fiber length should preferably be greater than 0.5 mm, and most preferably greater than 1.5 mm.

SUMMARY OF THE INVENTION

The primary object of the present invention is the provision of a process for the production of refractory shapes of ceramic fiber-containing material, wherein the shapes exhibit improved mechanical properties and especially an improved resistance to corrosion, particularly by hot gases. In particular, the shapes produced in accordance with the process of the invention should also possess a high thermal shock resistance, both in air and in water, and be so inherently stable that they can also be worked further by mechanical machining processes, e.g. milling.

This object is achieved by a process which is characterized by the fact that refractory fibers are used wherein at least 90% of the fibers have a length of not more than 500 micrometers ($\mu$m); the flocculant is added as aqueous solution for the dispersion of the fibers and particulate refractory materials and optionally other conventional additives; and pressure is applied to the shape being formed during the dewatering of the slurry to form the desired shape in order to compress the shape.

DETAILED DESCRIPTION OF THE INVENTION

More specifically, the present invention provides a process for producing a refractory shaped article, which comprises the steps of:

providing an aqueous slurry containing water, refractory fibers at least 90% by weight of which have a length of not more than 500 $\mu$m, and particulate refractory material, other than refractory fibers, having a particle size of up to 0.9 mm;

mixing said slurry with an aqueous solution of a flocculant to flocculate said particulate refractory material on said refractory fibers;

molding the resultant mixture under pressure while removing water from said mixture; and drying the resultant molded article.

The refractory fibers used for the production of the shapes are conventional ceramic fibers with an $Al_2O_3$ content of 45% by weight or higher. Such known fireproof or refractory fibers are commonly identified by their limiting operating temperatures, which are normally 1260° C., or 1600° C. for fibers with a relatively high $Al_2O_3$ content.

Preferably, at least 98% by weight of the refractory fibers have a length of not more than 500 $\mu$m.

It is also preferable that the refractory fibers are pre-fired at a temperature of at least 900° C. before being incorporated in the aqueous slurry.

The particulate refractory materials used in the present process are conventional refractory materials, e.g., $SiO_2$, $Al_2O_3$, fire clay, kaolin, zirconium dioxide, zirconium silicate, titanium dioxide, and chromium oxide ($Cr_2O_3$). These refractory materials can be used either alone or in mixtures of two or more. The materials are employed either in fine-grained form, i.e., with particle sizes up to 0.9 mm, or in a finely divided form, i.e., with particle sizes less than 0.09 mm, and preferably less than 0.044 mm. $SiO_2$ and $Al_2O_3$ can also be used in colloidal form as aqueous sols or gels.

Other conventional additives can be used in the process of the invention, such as inorganic and/or organic binders, e.g., inorganic phosphates such as aluminum phosphates, and organic binders such as starches and carboxymethyl cellulose, and optionally surface-active agents.

Flocculants are used in the process in accordance with the invention. Examples of the flocculants include cationic starches, cationic, anionic and nonionic surface-active agents, as well as polymeric flocculants such as the flocculants disclosed in European Patent Application 0 077 444, e.g., polyacrylamides, polyacrylimides, and aminopolyamides. They are preferably used in amounts of 0.5 to 12 parts by weight per 100 parts by weight of solids in the aqueous slurry.

The refractory fibers are generally supplied in lengths up to 50 mm. According to one embodiment of the process of the invention, these refractory fibers are first converted into an aqueous suspension with a concentration or consistency of 5 to 20 parts by weight of fiber relative to 100 parts by weight of the water content of the suspension, and are then reduced in length in high-speed mixers in this slurry state in the suspension until at least 90% of the fibers achieve a maximum length of not more than 500 μm. The appropriate processing time can readily be determine by preliminary tests and sampling as well as by determining the fiber length spectrum. High-speed turbo mixers can be used for shortening the fibers. Processing time in such an apparatus depends on the crude fiber, density of material, the apparatus used, and the desired fiber length, but can be readily determined by preliminary testing.

The refractory materials and optionally other additives can also be added in this step of the process of the invention, i.e. while shortening the fiber length.

Furthermore, as indicated above, refractory fibers which have been prefired can be used here. The advantage of using prefired fibers is that they have less resilience so that, if prefired fibers are employed, shapes with a relatively high density can be obtained, assuming the mixing ratios of the individual constituents are the same.

In the process of the invention, the ratio of refractory fibers to particulate refractory materials is preferably 100 parts by weight of fibers to 1 to 40 parts by weight of particulate refractory material. More preferably, 5 to 25 parts by weight of particulate refractory material are used per 100 parts by weight of fibers.

The content of binder in the slurry is preferably in the range of 0.1 to 3 parts by weight per 100 parts by weight of refractory fibers and particulate refractory material.

Even when using an amount of particulate refractory material up to 15 parts by weight, preferably up to 10 parts by weight, per 100 parts by weight of refractory fibers, there are obtained, after firing, solid shapes that have a high ultimate blending strength and do not exhibit the softness of conventional shapes made from fibrous materials with relatively high content of fibers.

The flocculants or a mixture of flocculants is then added to the slurry. For this purpose, before adding the flocculant, the slurry may be prediluted to a consistency such that the ratio of solids to water is 1 part solids:up to 150 parts water.

The flocculant is preferably not added to such a large amount of water that the consistency of the slurry is lowered thereby. The flocculants are preferably added as a dilute aqueous solution to the slurry, usually in concentrations of 1 to 5% by weight of flocculant based on the weight of the aqueous solution.

The desired shapes are formed by hydroextraction in a dewatering mold, usually in a die box with a perforated bottom. However, in this case it is essential that, during the removal of the water from the suspension, the shape being formed is subjected to pressure, i.e., the shape is pressed together during its formation in order to compress it.

Preferably, the pressure is applied mechanically by pressing with a pressure punch, the applied pressure being preferably at least 2 bars.

It has been found that a substantial increase in density in this combined process of removing water from the suspension and applying pressure is only possible if at least 90% by weight of the fibers have a length of not more than 500 μm.

A major advantage of the shaped articles produced in accordance with the process of the invention is that they undergo a major increase in density during the pressing operation without the occurrence of so-called "resilience" or recovery, i.e., a gradual decline in density, due to automatic expansion of the molded articles.

Depending on the addition of particulate refractory materials, the densities of the shapes in the dry state without the application of pressure during the dewatering are, for example, 100 kg/m$^3$, whereas with application of pressure, i.e., during the pressing operation, densities of at least 200 kg/m$^3$ can be obtained, even up to 1000 kg/m$^3$, i.e., a lasting and stable increase in the density can be achieved by a factor up to 10. The application of pressure to the shapes during the dewatering process can also be achieved by rolling if the molded articles are plates, otherwise it is necessary to use a mold which is adapted to the form of the shaped item. By adjusting the molding pressure, the desired increase in density can be set within any possible range as required.

According to another embodiment, the process also includes a step according to which the shapes are heated to such a high temperature that the fibers and the particulate refractory materials are sintered to and/or with one another to form a mechanically stable structure. This step is especially advantageous whenever the shapes during use are not heated as a whole to such a high temperature that sintering together takes place, or whenever the shapes so produced are still to be processed further by mechanical treatment, e.g., milling.

The invention also relates to the shaped articles produced in accordance with the process, which, after firing, possess a thermal shock resistance of more than 30 cycles during quenching in air as well as in water.

The shapes of the invention can be used in numerous applications either as shapes fabricated in accordance with the process of the invention or, in the case of shapes with a complex form and not readily producible in a mold, after subsequent machining. Thus, in fired shapes it is no problem to machine depressions, grooves, undercuts, etc. from the solid in a crude shape.

Examples of possible applications:

as pieces of kiln furniture or for the production thereof, especially the high strength being of advantage;

as filter elements or for the production of filter elements for exhaust gases, especially exhaust gases from internal combustion engines, the mechanical strength, i.e., minimal corrosion by high-velocity gases, being of advantage;

as linings, or for the production of linings, that come into contact with hot gases, especially high velocity gases, the minimal corrosion and the high mechanical strength again being of advantage;

as a heat exchanger element or for the production of heat exchangers, the facility for machining and the minimal corrosion by gases being of advantage;

as catalyst support;

as a ceramic base for shapes to be reinforced with aluminum or alloys thereof;

as infrared-impervious heat insulation in solar generators.

The invention will be further illustrated by the following examples, which are not intended to limit the invention.

EXAMPLE 1

100 parts by weight of aluminum silicate fibers with a limiting operating temperature of 1260° C. and an Al₂O₃ content of 47% were placed in 1000 parts by weight of water; 6 parts by weight of colloidal SiO₂, calculated as SiO₂, were also added to the water as a 30% by weight sol. Then, 20 parts by weight of grog meal with a maximum particle size of 0.9 mm were added. This slurry was processed for 20 minutes in a high-speed turbo mixer; thereafter, measurements on a sample showed that more than 93% of the fibers had been reduced to less than 0.5 mm in length. Then, 5 parts by weight of a cationic starch, dissolved in 1000 parts by weight of water, were added to this processed suspension, so that the resulting suspension had a solids-to-water ratio of about 1.2 to 20. This suspension was then agitated briefly until the initially turbid suspension became totally clear. Then, the suspension was molded in a compression-resistance preform screen on a perforated board with application of a pressure punch and creation of a vacuum to form a moist fiberboard 150 mm thick.

After compression and drying, the board had a gross density of 750 kg/m³. Drying occurred at conventional temperatures between 110° and 180° C.

The dried board fired for 72 hours at 1200° C. possessed a cold bending compressive strength of 2.3 N/mm² and thermal shock resistance of more than 30 cycles after quenching in air as well as in water.

EXAMPLES 2 TO 9

The method in Example 1 was repeated with the starting materials listed in the table below, whereby the test results obtained, together with the values given in the table, were determined on the shapes produced.

These examples show that the shapes produced, despite their high fiber content, exhibit a high density or a heavy unit weight and, after firing, have a high cold bending compressive strength.

The fibers in Example 1 were used as fibers A and fibers with a high Al₂O₃ content and a limiting operating temperature of 1600° C. were used as fibers B.

TABLE

| | EXAMPLE | | | | | | | | |
|---|---|---|---|---|---|---|---|---|---|
| | 1 | 2 | 3 | 4 | 5 | 6 | 7 | 8 | 9 |
| Fibers A (1260° C.) | 100 | 100 | 100 | 90 | 75 | 50 | 25 | — | — |
| Fibers B (1600° C.) | — | — | — | 10 | 25 | 50 | 75 | 100 | 100 |
| Colloidal SiO₂ | 6 | 2 | — | 7 | 5 | 5 | 3 | 6 | 5 |
| Kaolin (<44 μm) | — | 10 | 10 | — | 20 | — | 5 | — | — |
| Clay (<44 μm) | — | — | — | 2 | — | 12 | — | — | — |
| Zirconium dioxide (<44 μm) | — | — | — | — | — | — | — | — | 3 |
| Zirconium silicate (<44 μm) | — | — | — | — | — | 1 | — | — | — |
| Chromium oxide (<44 μm) | — | 2.5 | — | — | — | — | 0.5 | — | — |
| Titanium dioxide (<44 μm) | — | 0.75 | — | — | — | 0.5 | — | — | — |
| Grog meal (<90 μm) | 20 | — | — | — | — | — | — | — | — |
| Cationic starch* | 5 | — | 6 | 10 | 5 | 8 | 6 | 2 | — |
| Cationic polyacrylate** | — | 8 | — | — | 1 | — | — | 0.5 | 5 |
| Anionic surfactant*** | — | — | — | 1 | — | — | — | — | — |
| Properties: | | | | | | | | | |
| Bulk density (kg/m³) | 750 | 500 | 480 | 250 | 600 | 590 | 620 | 670 | 520 |
| burned at °C. | 1200 | 1200 | 1200 | 1250 | 1300 | 1300 | 1450 | 1250 | 1550 |
| TSR**** in air | >30 | >30 | >30 | >30 | >30 | >30 | >30 | >30 | >30 |
| TSR in water | >30 | >30 | >30 | >30 | >30 | >30 | >30 | >30 | >30 |
| CBCS***** (N/mm²) | 2.3 | 2.0 | 2.2 | 1.8 | 2.1 | 3.6 | 4.5 | 5.9 | 4.2 |

NOTES TO THE TABLE
*As a 2.5 weight % solution in water, calculated as a solid;
**As a 1.0 weight % solution in water, calculated as a solid;
***As a 0.5 weight % solution in water, calculated as a solid, a flocculant, trade name Rohafloc SF 170 from Rohm;
****Thermal shock resistance, cycles
*****Cold bending compressive strength

We claim:

1. A process for producing a refractory shaped article, which comprises the steps of:
   providing an aqueous slurry containing water, refractory fibers at least 90% by weight of which have a length of not more than 500 μm, and particulate refractory material, other than refractory fibers, having a particle size of up to 0.9 mm, wherein said slurry contains 1 to 40 parts by weight of said particulate refractory material per 100 parts by weight of said refractory fibers;
   mixing said slurry with an aqueous solution of a flocculant to flocculate said particulate refractory material on said refractory fibers;
   molding the resultant mixture under pressure while removing water from said mixture; and
   drying the resultant molded article.

2. A process according to claim 1, wherein at least 98% by weight of said refractory fibers have a length of not more than 500 μm.

3. A process according to claim 1, wherein said pressure in said molding step is applied to said mixture by means of a pressure punch.

4. A process according to claim 1, wherein said pressure in said molding step is at least 2 bars.

5. A process according to claim 1, wherein said refractory fibers have been prefired at a temperature of at least 900° C.

6. A process according to claim 1, which further comprises a step of heating said dried molded article at a temperature sufficient to sinter said refractory fibers and particulate refractory material.

7. A process according to claim 1, wherein said slurry contains 5 to 25 parts by weight of said particulate refractory material per 100 parts by weight of said refractory fibers.

8. A process according to claim 1, wherein said refractory fibers are fibers having an $Al_2O_3$ content of at least 45% by weight.

9. A process according to claim 1, wherein said particulate refractory material is at least one member selected from the group consisting of $SiO_2$, $Al_2O_3$, fire clay, kaolin, zirconium dioxide, zirconium silicate, titanium dioxide and $Cr_2O_3$.

10. A process according to claim 1, wherein said particulate refractory material has a particle size of less than 0.09 mm.

11. A process according to claim 1, wherein said flocculant is used in an amount of 0.5 to 12 parts by weight per 100 parts by weight of solids in said slurry.

12. A process according to claim 1, wherein said aqueous solution of said flocculant contains 1 to 5% by weight of said flocculant based on the weight of said aqueous solution.

* * * * *